Oct. 20, 1964     H. J. ROSENBERG     3,153,705
SWITCHING SYSTEM FOR CONVEYOR SYSTEM
Filed Aug. 19, 1960     4 Sheets-Sheet 1

INVENTOR
Harold J. Rosenberg
BY Joseph A. Genovese
ATTORNEY

Oct. 20, 1964  H. J. ROSENBERG  3,153,705
SWITCHING SYSTEM FOR CONVEYOR SYSTEM
Filed Aug. 19, 1960  4 Sheets-Sheet 2
*Fig. 2*
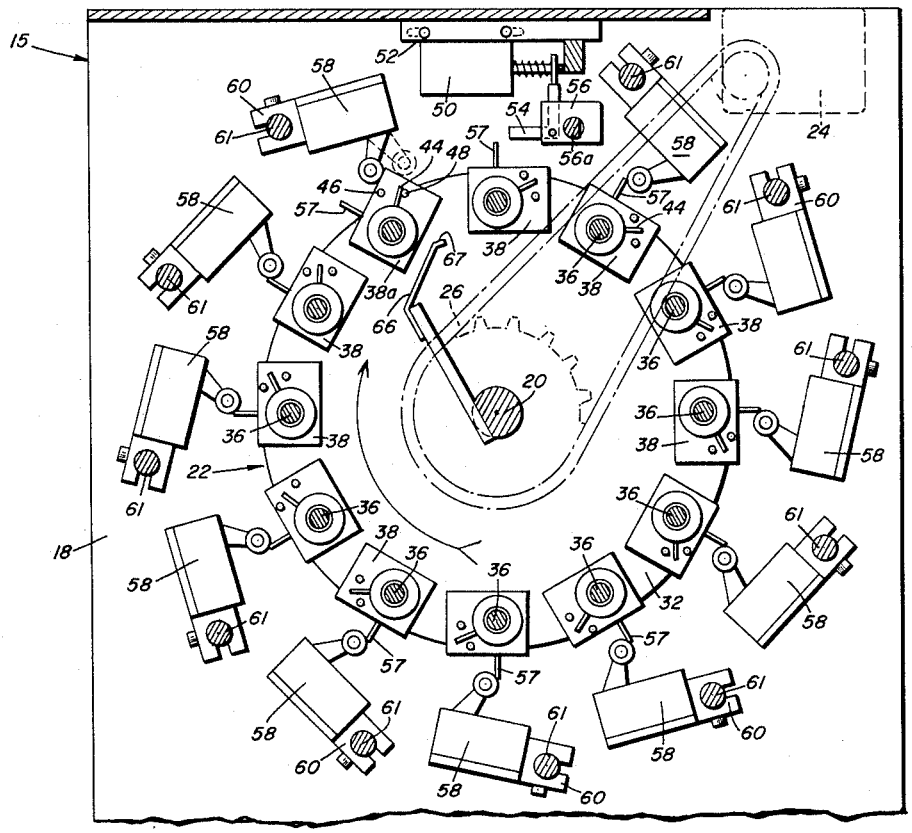
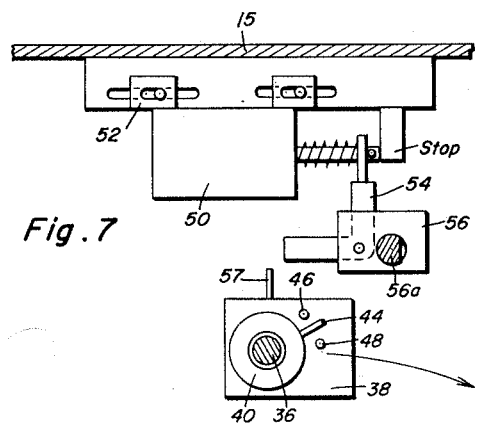
*Fig. 7*
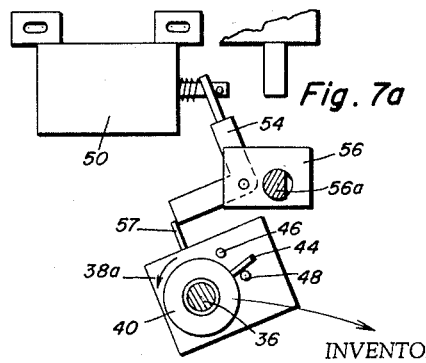
*Fig. 7a*
INVENTOR
Harold J. Rosenberg
BY  *Joseph A. Genovese*
ATTORNEY

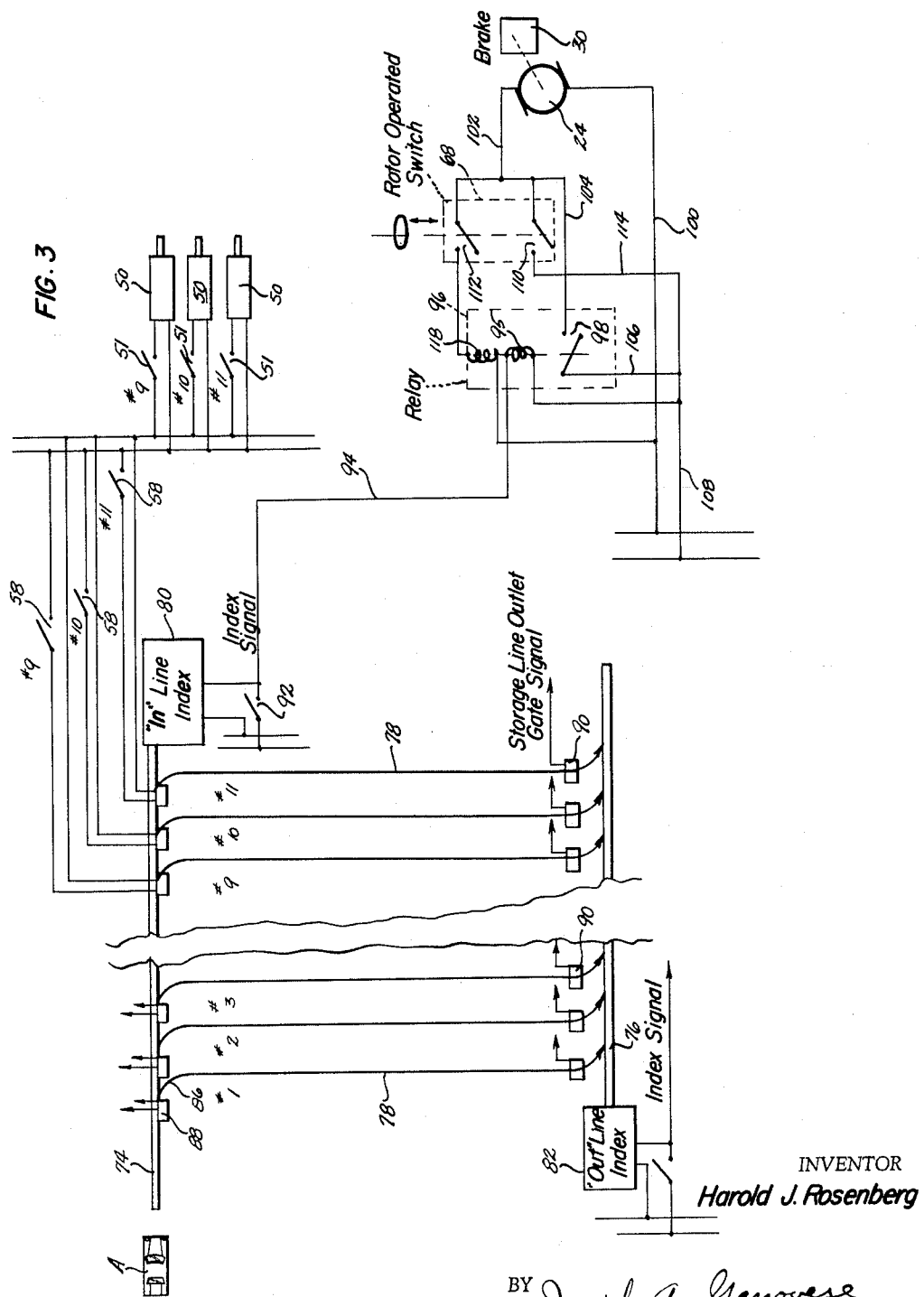

Oct. 20, 1964  H. J. ROSENBERG  3,153,705
SWITCHING SYSTEM FOR CONVEYOR SYSTEM
Filed Aug. 19, 1960  4 Sheets-Sheet 4

INVENTOR
Harold J. Rosenberg

BY Joseph A. Genovese
ATTORNEY 3,153,705
SWITCHING SYSTEM FOR CONVEYOR SYSTEM
Harold J. Rosenberg, Silver Spring, Md., assignor, by mesne assignments, to Control Data Corporation, Minneapolis, Minn., a corporation of Minnesota
Filed Aug. 19, 1960, Ser. No. 50,736
6 Claims. (Cl. 209—18)

This invention relates to memory devices and particularly to electromechanical memories to program or otherwise control the operation of mechanisms.

Electronic, optical and magnetic memories serving as information storage devices, are now quite common. Mechanical memories of a variety of types have been used for specific applications for a long time. For instance calculators sometimes rely on wheel settings to obtain a total after undergoing a calculation. As far as can be determined there is no commercially available, simple electro-mechanical memory for industrial machine control, which relies on an operating principle and electro-mechanical organization similar to the preferred embodiments of this invention. More complex, and consequently more expensive memories may certainly be used to serve the precise purposes of this invention, however, controls in accordance with this invention may be manufactured cheaply and with an exceedingly high inherent reliability. Accordingly, an object of this invention is to provide an electro-mechanical memory, which is inexpensive, not only in initial cost but also in operating costs and maintenance.

Another objective of the invention is to provide an electro-mechanical memory of moderate capacity that may be applied to various types of mechanisms, but which is particularly well-suited for industrial applications where reliability is of paramount importance.

A memory which typifies the invention is very simply constructed, consisting of a rotor provided with groups of multi-positional switch operators preferably so arranged that each group consists of a single row, spaced radially from the axis of rotation of the rotor. Control switches are provided adjacent to the rotor, and one switch operator of each horizontal row is investigated (as to position) by each switch during rotor movement. When any one of the control switches "sees" a switch operator in a given set position, an output from the switch results.

The control has means for setting a selected switch operator on a row-by-row basis in order to code or store information into the rotor. After the rotor has completed an information investigation duty cycle, all switch operators of a row are reset automatically to prepare them for another code information input procedure and information investigation cycle.

Memory control devices which exemplify the invention may be used in numerous environments, and by way of example one such application will be discussed. In dispatch of comparatively large articles, for instance, automobile bodies during inplant handling, the articles are fed to a conveyor system station in a heterogeneous group. A dispatcher has the responsibility of directing specific bodies to an outlet conveyor line in a given sequence.

The mechanisms handling the articles are arranged in a pattern with a shuttle inlet line feeding parallel temporary storage conveyor lines, and the parallel storage lines discharging to a shuttle outlet line. Although both shuttle lines could be made of continuously operating conveyors, it is simpler to operate them step-by-step, i.e., index the shuttle lines. Article diverting devices are at the junctures of the storage lines and the inlet shuttle line. Gates are at the junctures of the outlet ends of the storage lines and the outlet shuttle line. In the example being described, two memory control devices are suggested, one for the diverting devices at the storage lines inlets and one for the gates at the storage lines outlets, although it is possible to construct a single, more complex memory control device which would service both the inlets and outlets of the storage lines. It is preferred to have separate memory control devices in the interest of simplicity and versatility of the storage device.

When the inlet shuttle line is indexed, the memory rotor is also indexed so that the rotor functions as a slave to the inlet shuttle line. Assuming that a single indexing of the inlet shuttle line moves an article through a distance equal to the spacing between storage lines, the dispatcher will select one of the lines for an article at an index position on the shuttle inlet line, by actuating one of the multiple position switch operators of a single row of the rotor, responding to the selected storage line. The setting of a single switch operator of one row in this way stores information in the rotor in the form of a switch operator position. The next time that the shuttle inlet line is indexed and the slave rotor is correspondingly indexed, the dispatcher repeats the line selection procedure by setting a switch operator, storing the information in the rotor.

While the rotor is in the duty cycle, the dispatcher continues to store new information therein, however, previously inserted information is unloaded during the same duty cycle. The previously discussed group of fixed switches which investigate the positions of the switch operators, are arranged to be passed (not actuated) or actuated by one switch operator in each horizontal row as the drum is rotated. The stationary switches are operatively connected in circuit with the means to divert the articles from the inlet shuttle line, for instance by completing electrical circuits therewith in timed sequence with the arrival of the particular articles selected by the dispatcher when he actuated the switch operators.

The storage lines are unloaded by means of an identical memory control device. The only distinction between inlet and outlet memory controls is that the memory control for the outlet shuttle line is made to control the actuation of gates between the storage lines and the outlet shuttle line instead of diverter which are controlled by the other memory control device.

A further object of the invention is to provide a memory control device which may be continuously loaded with new information while it is being unloaded of current information, and which functions to integrate the operation of several mechanism, for example, a conveyor and a group of diverting devices for articles carried by the conveyor.

Other objects and features will become evident in following the description of the illustrated form of the invention, which is given by way of example only.

FIGURE 2 is a fragmentary sectional view taken approximately on the line 2—2 of FIGURE 1.

FIGURE 3 is a schematic view showing one possible application of memory control devices and also showing portions of the circuits of one control device and how the circuits are connected with the mechanisms which they control.

FIGURES 7 and 7a show how an operator is set to the "on" position.

Figure 1:
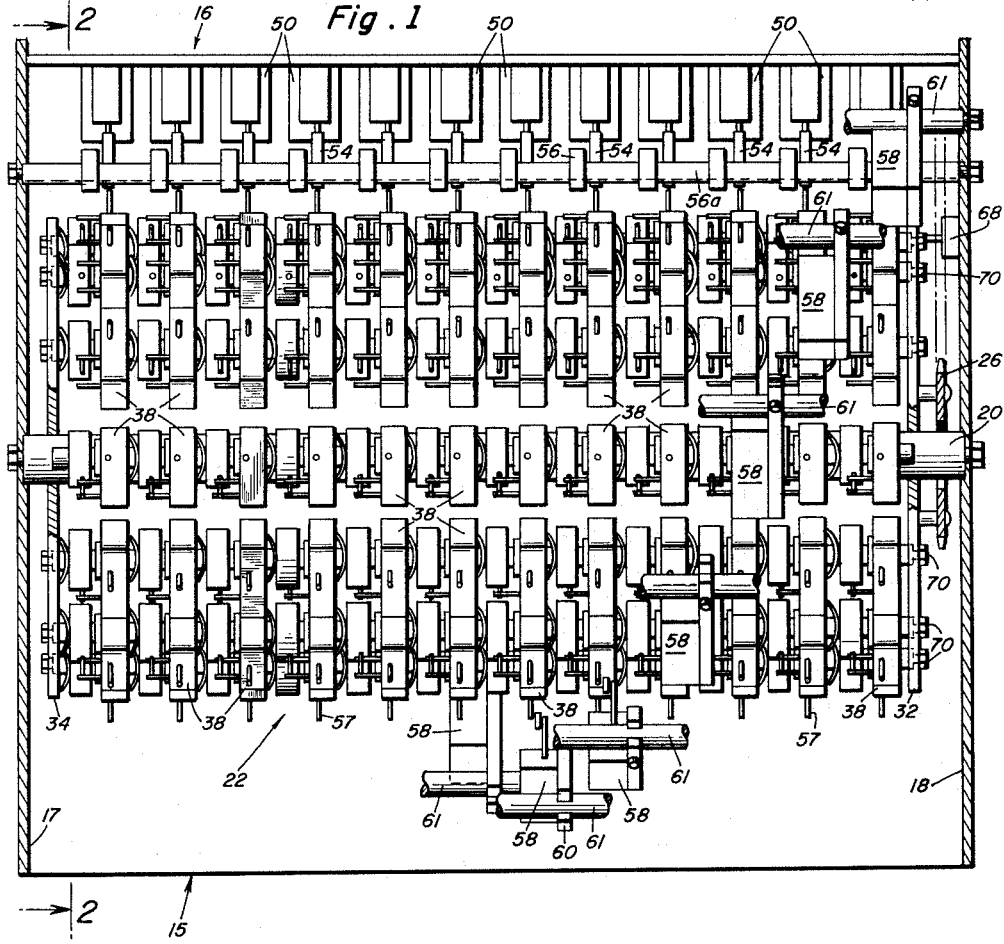
FIGURE 1 is a fragmentary front elevational view of one of the control devices.

Memory control device 16 shown in FIGURES 1 and 2 exemplifies the invention. It consists of frame 15 having sides 17 and 18 to which fixed spindle 20 is secured. A movable structure such as rotor 22 is mounted on spindle 20 between the sides of the frame, and the rotor is suitably driven, for instance by electric motor 24 and a chain and sprocket transmission 26. A constant drag is applied to the rotor, for example a conventional electric brake 30 on the shaft of the motor (FIGURE 3) in order to prevent the rotor from over-shooting when motor 24 is de-energized.

Figure 6:
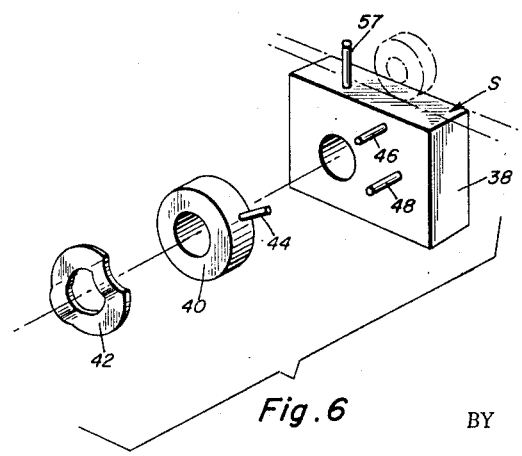
FIGURE 6 is a perspective view showing a switch operator assembly.

Rotor 22 has a pair of end plates 32 and 34 between which a number of rods 36 extend. Each rod is secured to plates 32 and 34, and has a group of switch operators 38 capable of being adjusted to selected positions (FIGURES 7 and 7a) and frictionally maintain the position of adjustment. The position of one of the switch operators shown in FIGURE 7 is an "off" position while the position 38a (FIGURE 7a) is the "on" position. A spacer 40 (FIGURE 6) together with a friction washer 42 are located between each pair of operators 38, and the spacer has a stop 44 (FIGURE 7a) located between the pair of pins 46 and 48 attached to typical operator 38. This establishes the limits of adjustment of the switch operator to the "on" and "off" positions respectively.

Figure 5:
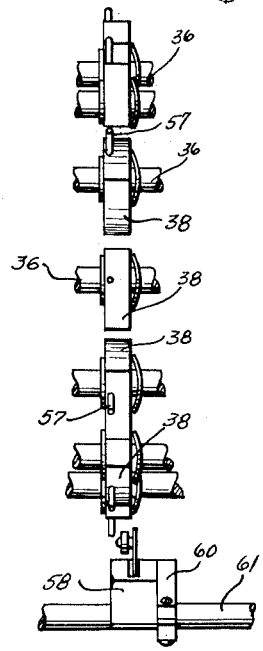
FIGURE 5 is a fragmentary elevational view showing how the switch operators in a vertical plane interrogate one of the switches of FIGURE 4.

There are means attached to frame 15 for setting any one (or more) of the switch operators to the "on" positions. A reliable setting device is seen best in FIGURES 2, 7 and 7a and consists of a solenoid 50 (also see FIGURE 3) attached by an adjustable mount 52, e.g., screws and slots, to the top of frame 15. There is one solenoid 50 for each vertical row of operators 38 (FIGURE 5) of rotor 22. Each solenoid is operated (FIGURE 3) by conventional means such as switches 51, however, to avoid manually holding the switches closed, they may be locked closed after manual actuation until the rotor indexes. Lever or interposer 54 is mounted for rocking movement on a support 56 attached to rod 56a parallel to the axis of rotation of the rotor. One end of lever 54 is mechanically coupled to the armature of solenoid 50, and the other end of the lever is movable into and from the path of travel of pin 57 that is secured to operator 38, there being one pin on each operator. Assume the lever 54 to be in a given position, FIGURE 7a ("down" instead of "up" as shown in FIGURES 2 and 7 where lever 54 clears pin 57) as the actuator or operator 38 moves with the rotor in the direction of the arrow, pin 57 strikes the end of lever 54, causing the switch operator 38 to be turned on its rod 36 and achieve the "on" position 38a.

Figure 4:
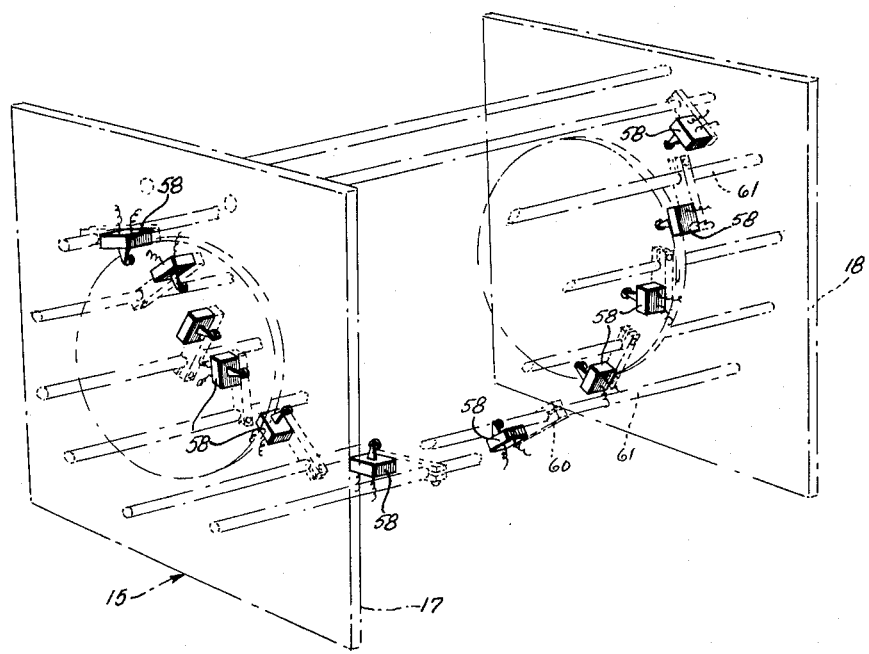
FIGURE 4 is a diagrammatic perspective view showing the arrangement of read out switches of the memory control device.

A group of information read-out of control switches 58 (FIGURES 1, 2 and 4) are fixed with respect to rotor 22. For example, switches 58 may be secured to frame 15 by an adjustable clamp 60 on frame supported rods 61 so that the switches may be mounted, adjusted and held in proper adjustment. Switch operators 38 are in side by side relationship on rods 36 in each group, and the sets or groups are radially spaced from the axis of rotation from the rotor. Read-out switches 58 are in laterally spaced planes perpendicular to the axis of rotation, and they are in a spiral pattern (FIGURE 4), i.e., each adjacent switch is circumferentially spaced along the envelope described by rotation of the rotor. Lateral spacing of switches 58 is such that one switch investigates the position of one switch operator 38 on each rod 36 as the rotor is operated. This is accomplished by the switch actuation arm of a given switch being either cleared by an operator 38 (operator in the "off" position) or being engaged by the surface "s" (FIGURE 6, operator in "on" position) of the operator and causing the switch to be actuated. When the rotor operates through one complete 360° cycle, one read-out switch 58 (FIGURE 5) will have investigated the position of one set of operators, where a set is defined as one operator on each rod 36 in a single vertical plane.

An automatic reset device for the switch operators 38 functions in response to rotation of the rotor. The reset device consists of a clearing bar 66 (FIGURE 2) parallel to the axis of the rotor and secured stationarily, for instance by being attached to spindle 20, within the cylinder described by rods 36 as the rotor functions. Clearing bar 66 has an edge 67 projecting into the path of movement of the inner portions of all actuators 38 of a single horizontal row (FIGURE 2) to automatically reset the actuators, one row at a time as the rotor operates. Rotor stop switch 68 is secured to frame 15 (FIGURES 1 and 3) and is actuated by projections 70 secured to plate 32 of the rotor. There is one projection 70 for each row of switch actuators 38 to open the circuit of motor 24 and allow the rotor to stop at predetermined angular positions of rotor motion.

The duty cycle, informational content capacity, and use of memory device 16 may be varied considerably depending on the requirements of the mechanisms with which it is associated. However, to show a typical use of the memory device, attention is drawn to FIGURE 3 showing a conveyor system as an example of a mechanism with which my device 16 has been used. One part of the conveyor system is inlet shuttle line 74, e.g., a mechanical conveyor, and another part is an outlet shuttle line 76 connected by parallel storage conveyor lines 78. Any number of temporary storage lines 78 may be connected between shuttle lines 74 and 76 and therefore lines 1, 2, 3, 9, 10 and 11 are illustrated. An electrically operated in indexing mechanism 80 is connected with shuttle line 74, and a similar out indexing mechanism 82 is connected with shuttle line 76. The shuttle line 74 is used to handle articles A, for instance, automobile bodies, engines, packages, etc., and they are received on line 74 heterogeneously. The inlet of each storage line is communicated with line 74 by means of an article control, e.g., diverting, means 86 which may include a gate, a deflector, a rail switch, etc. An electrical actuator 88 constitutes a part of each diverting means 86 to switch the article off line 74 and into one of the storage lines 78. The outlet ends of storage lines 78 are connected with shuttle line 76 by means of gates 90 which respond in function to the diverting means 86, except they allow the articles in the storage lines to load shuttle line 76.

Two memory devices 16 are preferred for the conveyor system shown in FIGURE 3, but since both will be identical, only one is partially diagrammatically shown. Assume that the dispatcher sees an article moving on shuttle line 74 and he knows that this article should not be placed on shuttle line 76 until ten or twelve different articles which have not yet arrived on shuttle line 74 are placed on shuttle line 76. The dispatcher continues to index shuttle line 74, for instance by closing switch 92, or this function may be automatically accomplished. The dispatcher knows that article A must not go directly to shuttle line 76 and therefore the dispatcher will close one of the switches 51 to actuate one of the solenoids 50, a few of these switches being shown in FIGURE 3 and identified as 9, 10, and 11, to correspond with storage lines numbers 9, 10 and 11. What happens when one of the solenoids 50 is energized has already been described, i.e., one of the switch operators 38 on a given rod 36 will be moved from the "off" to the "on" position, thereby storing information in the rotor 22 of the memory control device (FIGURES 1 and 2). When the article reaches the line 78 selected in this way, rotor 22 will have rotated (by being indexed) to the position at which the diverting means 86 are actuated to divert the article into the dispatcher selected storage line. This same procedure is followed for each article to get the articles into the storage lines. They are unloaded from the storage lines by an identical unloading program fed into the other control device 16 which has been mentioned but which is not shown.

In order to obtain the necessary synchronism between control device 16 and shuttle line 74, together with the diverters 86, there is one row of switch operators 38 (on one rod 36) for each storage line 78 and one read-out switch 58 for each storage line 78. Projections 70 are circumferentially spaced so that the rotor operates (indexes) a distance proportional to the number of rows of operators 38 being used. Motor 24 is energized in synchronism with the energization of the index mechanism 80, this being diagrammatically shown by switch 92 and line 94 extending therefrom. The motor operating circuit (FIGURE 3) functions in this way: Assume that the rotor-operated switch 68 is in the open position, i.e., the rotor is stopped with a projection 70 holding switch 68 open. When a pulse or signal voltage of a suitable type is applied to line 94 upon manually closing switch 92, coil 95 of latching relay 96 is energized thereby closing the switch section 98 thereof, allowing current to flow from a line source through conductor 100, motor 24, lines 102, 104, relay switch section 98, lines 106 and 108 back to the line source. Switch 68 immediately returns to its normally closed position (because the rotor turns), thereby closing switch sections 110 and 112 and establishing a path 114 parallel to line 106, to the line voltage source. Instantaneously, or very shortly thereafter, depending on the contact settings of switch sections 110 and 112, coil 118 is energized by way of switch section 112, opening switch section 98 of relay 96 and preparing it for the next cycle of operation. Consequently, the rotor motor 24 continues to function until the motor circuit is broken by the next projection 70 again opening switch 68 so that when a new index pulse or signal is received on line 94 and the latching relay coil 95 is again energized to restart the indexing of rotor 22 with the indexing of shuttle line 74.

It is understood that the illustrated and described embodiments of the invention are given by way of an example only, and that many variations and modifications may be made without departing from the scope of the following claims.

I claim:

1. In a conveyor system which has a conveyor, means to actuate said conveyor, a plurality of article-control means associated with said conveyor and adapted to be electrically operated, the improvement comprising a memory control device for providing electrical signals to operate predetermined control means, said memory control device comprising a stationary frame, a rotor mounted on said frame, means to actuate said rotor in coordination with said conveyor, said rotor having a plurality of rows of multi-position switch operators, said rows movable with said rotor, means to actuate a selected switch operator of individual rows as said rotor is rotated in coordination with said conveyor, the selection of the switch operators of the said rows being in accordance with the particular control means which is to be subsequently operated, a switch for each of said control means, said switches being secured to said frame and so arranged in planes that one predetermined operator of each row moves adjacent thereto during the rotation of said rotor so that any one of said predetermined operators in a given position will actuate its switch and provide a signal for said control means with which it is associated.

2. In a conveyor system which has a conveyor, means to actuate said conveyor, a plurality of control means associated with said conveyor along the length thereof and adapted to be electrically operated, the improvement comprising a memory control device for providing electrical signals to operate said control means in a preselected order, said control device comprising a stationary frame, a rotor mounted for rotation on said frame about a first axis, means to rotate said rotor in coordination with the actuation of said conveyor, circuit means to control the operation of each of said control means, said circuit means including a switch for each control means, said switches being attached to said frame and circumferentially arranged around said rotor and longitudinally spaced with reference to said axis of rotation, said rotor having a plurality of rows of multi-position switch operators which actuate said switches when in one position, said switches physically arranged so that one switch operator of each row moves through a switch-actuating position during one revolution of said rotor whereby if any operator is in said one position its associated switch will be actuated, and means coordinated with said conveyor actuating means to operate a selected switch operator to said one of said positions during the rotation of said rotor so that said rotor can be continually loaded with switch operator position defining information as other switch operators of said rows which have been previously adjusted operate their associated switches.

3. An electro-mechanical memory control device for a mechanism which has a moving part, said memory control device comprising a relatively stationary frame and a structure connected with said frame, said structure being movable with respect to said frame in an endless path, means synchronized with said moving part for moving said structure as a slave thereto in said endless path, a plurality of rods extending across said structure, each rod having a plurality of operators which are movable rotationally on said rods between first and second respective positions, a plurality of operator adjusting means connected to said frame and arranged to be selectively actuated to interposing and non-interposing positions with respect to said operators to cause selected operators of said rows thereof to be actuated to said second position as said structure moves in its said path of travel, each operator adjusting means servicing a set of said operators where a set is defined as one operator on each of said rods, and means including a plurality of switches attached to said frame to sense the position of each operator of said sets as said structure moves and thereby to provide output electrical signals for said mechanism.

4. A mechanical memory device comprising a stationary frame, a rotor connected with said frame for rotation about an axis of rotation, a plurality of switches attached to said frame and located radially outwardly of said rotor, said switches being both circumferentially and laterally spaced from each other, a plurality of rows of switch operators on said rotor, each row containing a plurality of said operators, one operator of each row being located in a plane transverse to said axis of rotation to form a set, so that upon a single revolution of said rotor each operator of one set moves past the same one of said switches, means mounting each operator on said rotor for adjustment between respective set and reset positions, said operators engaging and actuating their respective switches when in the set position and failing to actuate their said switches when in the reset position, means at one station of the frame for setting selected operators in each row during the rotation of said rotor to thereby program the operators row-by-row as they pass said station while other operators of said sets pass by the respective switches, and means to reset all of the operators in the set position after they have been moved by said rotor past said switches.

5. The mechanical memory device of claim 4 wherein said setting means include a group of interposers in a row parallel to and radially spaced from said rotor axis, and means to actuate selected interposers between non-interposing and interposing positions with respect to said rows of operators during rotation of said rotor.

6. The mechanical memory device of claim 4 and each operator having a plurality of stops associated therewith to establish limits for the adjustment thereof between the set and reset respective positions.

References Cited in the file of this patent

UNITED STATES PATENTS

| 2,669,615 | Cox | Feb. 16, 1954 |
| 2,691,081 | Weber | Oct. 5, 1954 |
| 2,751,091 | Freeman | June 19, 1956 |
| 2,901,089 | Rabinow | Aug. 25, 1959 |
| 2,979,183 | Capanna | Apr. 11, 1961 |